(12) United States Patent
Chan (10) Patent No.: US 9,374,713 B2
(45) Date of Patent: Jun. 21, 2016

(54) METHOD AND DEVICE FOR INTELLIGENT FREQUENCY HOPPING IN A SHARED FREQUENCY BAND

(75) Inventor: Lye Hock Bernard Chan, Penang (MY)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 1515 days.

(21) Appl. No.: 12/608,156

(22) Filed: Oct. 29, 2009

(65) Prior Publication Data

US 2011/0103428 A1    May 5, 2011

(51) Int. Cl.
*H04B 1/715*    (2011.01)
*H04W 16/14*    (2009.01)

(52) U.S. Cl.
CPC ............... *H04W 16/14* (2013.01); *H04B 1/715* (2013.01)

(58) Field of Classification Search
USPC ......... 375/132, 133, 134, 135, 136, 137, 295, 375/316
See application file for complete search history.

(56) References Cited

U.S. PATENT DOCUMENTS

| | | | | |
|---|---|---|---|---|
| 4,850,036 | A * | 7/1989 | Smith | 455/502 |
| 5,852,630 | A * | 12/1998 | Langberg et al. | 375/219 |
| 6,256,334 | B1 | 7/2001 | Adachi | |
| 6,643,278 | B1 * | 11/2003 | Panasik et al. | 370/330 |
| 7,236,511 | B2 | 6/2007 | Batra et al. | |
| 2005/0047481 | A1 * | 3/2005 | Lyle et al. | 375/132 |
| 2005/0058181 | A1 * | 3/2005 | Lyle et al. | 375/133 |
| 2005/0141562 | A1 * | 6/2005 | Chen et al. | 370/480 |
| 2005/0191964 | A1 | 9/2005 | Hundal | |
| 2005/0220135 | A1 | 10/2005 | Honda et al. | |
| 2006/0093018 | A1 * | 5/2006 | Chi | 375/136 |
| 2006/0240777 | A1 | 10/2006 | Ruuska | |
| 2007/0165754 | A1 * | 7/2007 | Kiukkonen et al. | 375/346 |
| 2007/0206660 | A1 * | 9/2007 | Lifchuk | 375/132 |
| 2010/0029325 | A1 * | 2/2010 | Wang et al. | 455/553.1 |
| 2010/0120362 | A1 | 5/2010 | Walley et al. | |

FOREIGN PATENT DOCUMENTS

| | | |
|---|---|---|
| GB | 2399982 A1 | 9/2004 |
| WO | WO-02/25832 | 3/2002 |

OTHER PUBLICATIONS

P. Popovski et al., "Strategies for adaptive frequency hopping in the unlicensed bands", IEEE Wireless Communications, vol. 13, Issue 6, Dec. 2006 pp. 60-67.
http://www.usenix.org, Dominic Spill, et al., "BlueSniff: Eve meets Alice and Bluetooth," USENIX Workshop on Offensive Technologies (2007) pp. 1-10.
http://ossmann.blogspot.com, Michael Ossman, "Narrowing the Hop Search," (Nov. 13, 2008), 2 pgs.

* cited by examiner

*Primary Examiner* — Siu Lee (57) ABSTRACT

A non-Bluetooth device operates in a same frequency band as Bluetooth devices by employing a method of intelligent frequency hopping. The method includes: scanning a frequency band for frequency hopping communications in the frequency band by one or more Bluetooth communication devices communicating according to a Bluetooth communication protocol; determining a first frequency hopping sequence utilized by the one or more Bluetooth communication devices according to the Bluetooth communication protocol; determining a second frequency hopping sequence within the frequency band to avoid interference from the frequency hopping communications by the one or more Bluetooth communication devices; and establishing a wireless communication connection between two non-Bluetooth devices, the wireless communication connection operating in the frequency band according to a second wireless communication protocol different than the Bluetooth communication protocol, and using the second frequency hopping sequence.

16 Claims, 5 Drawing Sheets

METHOD AND DEVICE FOR INTELLIGENT FREQUENCY HOPPING IN A SHARED FREQUENCY BAND

BACKGROUND

As the demand for wireless communication applications and systems continues to expand, the availability of frequency spectrum becomes increasingly scarce. To address the increased pressure on limited frequency spectrum resources, a number of frequency bands are now being shared among different devices that communicate using different communication protocols.

An example of a shared frequency band is the 2.4 GHz frequency band for unlicensed devices. Among the devices that share the 2.4 GHz band are wireless local area network (WLAN) devices communicating according to various standard protocols of the Institute of Electrical and Electronics Engineers (IEEE) 802.11 standard (e.g., the IEEE 802.11b protocol, the IEEE 802.11g protocol, etc.), and Bluetooth devices communicating according to the Bluetooth protocol.

However, other unlicensed devices are also permitted to share the 2.4 GHz band with IEEE 802.11 and Bluetooth devices. Therefore, it is important for these other unlicensed devices to arrange their communications in such a way as to minimize or avoid interference from other devices, and particularly Bluetooth devices, with which they share the spectrum. Indeed, in general, it is desirable for devices which share common spectrum resources to minimize or avoid interference from other devices using that spectrum.

What is needed, therefore, is method of avoiding interference when using shared spectrum resources, and a device capable of executing such a method. What is also needed is a method for non-Bluetooth devices to share spectrum with Bluetooth devices operating in the same area, and a non-Bluetooth device capable of sharing spectrum with Bluetooth devices operating in the same area.

SUMMARY

In an example embodiment, a method comprises: scanning a frequency band for frequency hopping communications in the frequency band by one or more Bluetooth communication devices communicating according to a Bluetooth communication protocol; determining a first frequency hopping sequence utilized by the one or more Bluetooth communication devices according to the Bluetooth communication protocol; determining a second frequency hopping sequence within the frequency band to avoid interference from the frequency hopping communications by the one or more Bluetooth communication devices; and establishing a wireless communication connection between two non-Bluetooth devices, the wireless communication connection operating in the frequency band according to a second wireless communication protocol different than the Bluetooth communication protocol, and using the second frequency hopping sequence. In an embodiment, the first frequency hopping sequence occurs at t e same rate as the second frequency hopping sequence.

In another example embodiment, a device comprises: a receiver configured to receive Bluetooth and non-Bluetooth signals; a transmitter configured to transmit non-Bluetooth signals; a processor configured to control operations of the receiver and transmitter; and a memory device configured to share data with the processor. The processor is configured to execute an algorithm. The algorithm comprises: controlling the receiver to scan a frequency band for frequency hopping communications in the frequency band by one or more Bluetooth communication devices communicating according to a Bluetooth communication protocol; determining a first frequency hopping sequence utilized by the one or more Bluetooth communication devices according to the Bluetooth communication protocol; determining a second frequency hopping sequence within the frequency band to avoid interference from the frequency hopping communications by the one or more Bluetooth communication devices; and controlling the receiver and transmitter to establish a wireless communication connection with a non-Bluetooth device, the wireless communication connection operating in the frequency band according to a second wireless communication protocol different than the Bluetooth communication protocol, and using the second frequency hopping sequence.

In yet another embodiment, a method is provided for communication by a first device. The method comprises: scanning a frequency band for frequency hopping communications within the frequency band by one or more first communication devices communicating according to a first communication protocol; determining a frequency hopping parameter utilized by the one or more communication devices according to the first communication protocol; determining a selected frequency hopping sequence within the frequency band to avoid interference from the frequency hopping communications by the one or more communication devices; transmitting to a second wireless device data identifying the selected frequency hopping sequence; and establishing a wireless communication connection with the second wireless device, the wireless communication connection operating in the frequency band according to a second wireless communication protocol different than the first communication protocol, and using the selected frequency hopping sequence.

In certain illustrative embodiments, the second frequency hopping sequence hops at a same rate as the first frequency hopping sequence. Notably, in an embodiment the second frequency hopping sequence hops between frequencies spanning at least 40 MHz.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions shown in the drawings may be arbitrarily increased or decreased for clarity of discussion. Wherever applicable and practical, like reference numerals refer to like elements.

DETAILED DESCRIPTION

In the following detailed description, for purposes of explanation and not limitation, example embodiments disclosing specific details are set forth in order to provide a thorough understanding of an embodiment according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparati and methods may be omitted so as to not obscure the description of the example embodiments. Such methods and apparati are clearly within the scope of the present teachings.

Unless otherwise noted, when a first device is said to be connected to a second device, this encompasses cases where one or more intermediate devices may be employed to connect the two devices to each other. However, when a first device is said to be directly connected to a second device, this encompasses only cases where the two devices are connected to each other without any intermediate or intervening devices. Similarly, when a signal is said to be coupled to a device, this encompasses cases where one or more intermediate devices may be employed to couple the signal to the device. However, when a signal is said to be directly coupled to a device, this encompasses only cases where the signal is directly coupled to the device without any intermediate or intervening devices.

Figure 1:
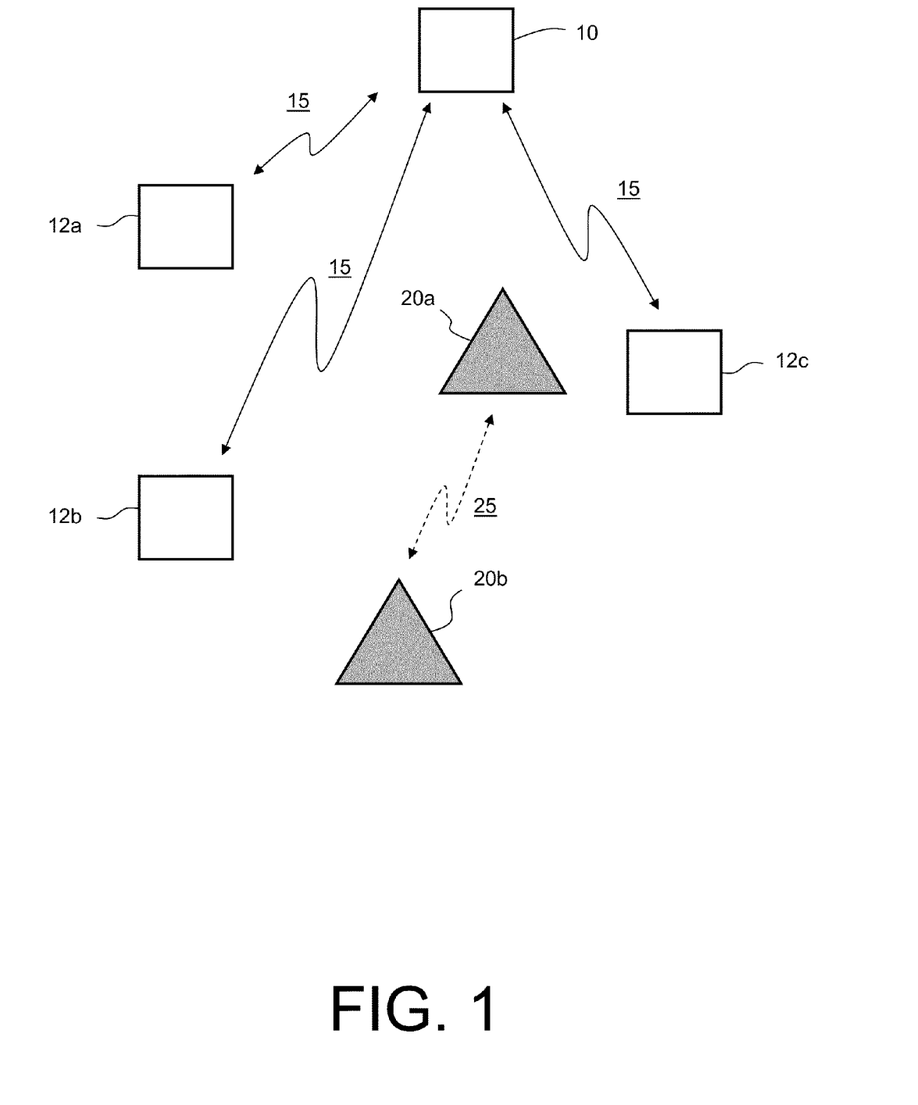
FIG. 1 illustrates an example of a plurality of devices communicating in the same vicinity as each other using a shared frequency band.

FIG. 1 illustrates an example of a plurality of devices communicating in the same vicinity as each other using a shared frequency band. In particular, FIG. 1 shows a master device 10 communicating with a plurality of slave devices 12a, 12b and 12c using communication transmissions 15 within a shared frequency band. Communication transmissions 15 conform to a first wireless communication protocol employed by master device 10 and slave devices 12a, 12b and 12c. In particular, master device 10 and slave devices 12a, 12b and 12c all communicate using a frequency hopping scheme which hops among a plurality of frequencies which span the shared frequency band, and wireless transmissions 15 are frequency hopping transmissions.

FIG. 1 also shows first and second wireless devices 20a and 20b communicating in the same vicinity, and in the same shared frequency band, as master device 10 and slave devices 12a, 12b and 12c. First and second wireless devices 20a and 20b employ wireless transmissions 25 that conform to a second wireless communication protocol, different from the first wireless communication protocol. In particular, transmissions 25 may employ different modulation types, different error correction algorithms, and/or different power management schemes, etc. than those used in the first wireless communication protocol of transmissions 15. However, like wireless transmissions 15, wireless transmissions 25 of first and second wireless devices 20a and 20b are also frequency hopping transmissions which hop among a plurality of frequencies which span the shared frequency band.

Further details regarding embodiments of first and second wireless devices 20a and 20b will be described below.

Figure 2:
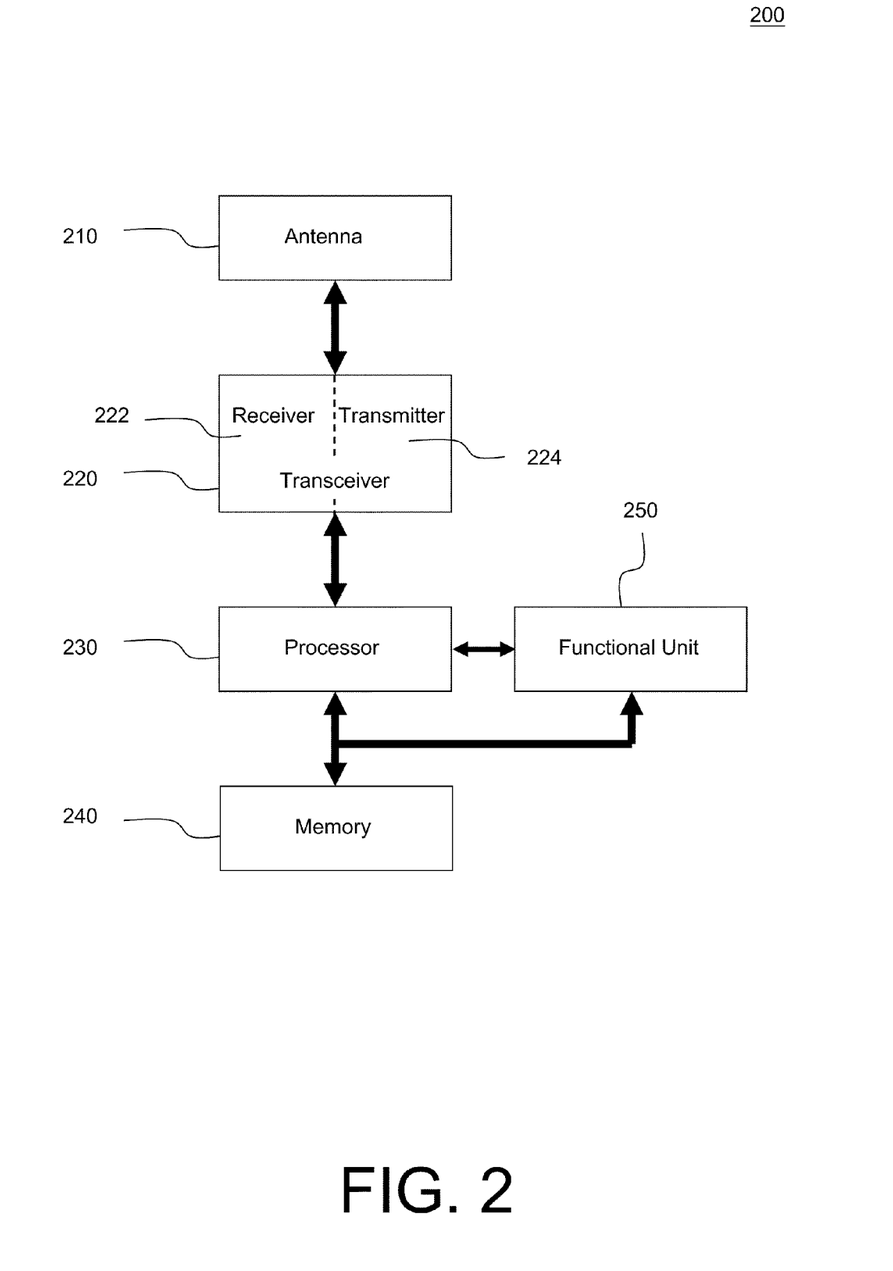
FIG. 2 is a functional block diagram of one embodiment of a wireless device.

FIG. 2 is a functional block diagram of one embodiment of a wireless device 200 which may correspond to wireless device 20a and/or wireless device 20b of FIG. 1.

Wireless device 200 includes an antenna 210, a transceiver 220, a processor 230, a memory device 240, and functional unit 250.

Transceiver 220 includes a receiver 222 and a transmitter 224 and provides functionality for wireless device 200 to communicate with other wireless devices according to a particular communication protocol that employs frequency hopping transmissions as described in greater detail below.

Processor 230 is configured to execute one or more software algorithms in conjunction with memory 240 to provide the functionality of wireless device 200. For example, in one or more embodiments processor 230 is configured to execute one or more steps of an algorithm or algorithms described below, for example with respect to FIG. 5. Beneficially, processor 230 includes its own memory (e.g., nonvolatile memory) for storing executable software code that allows it to perform the various functions of wireless device 200. Alternatively, the executable code may be stored in designated memory locations within memory 240.

Figure 3:
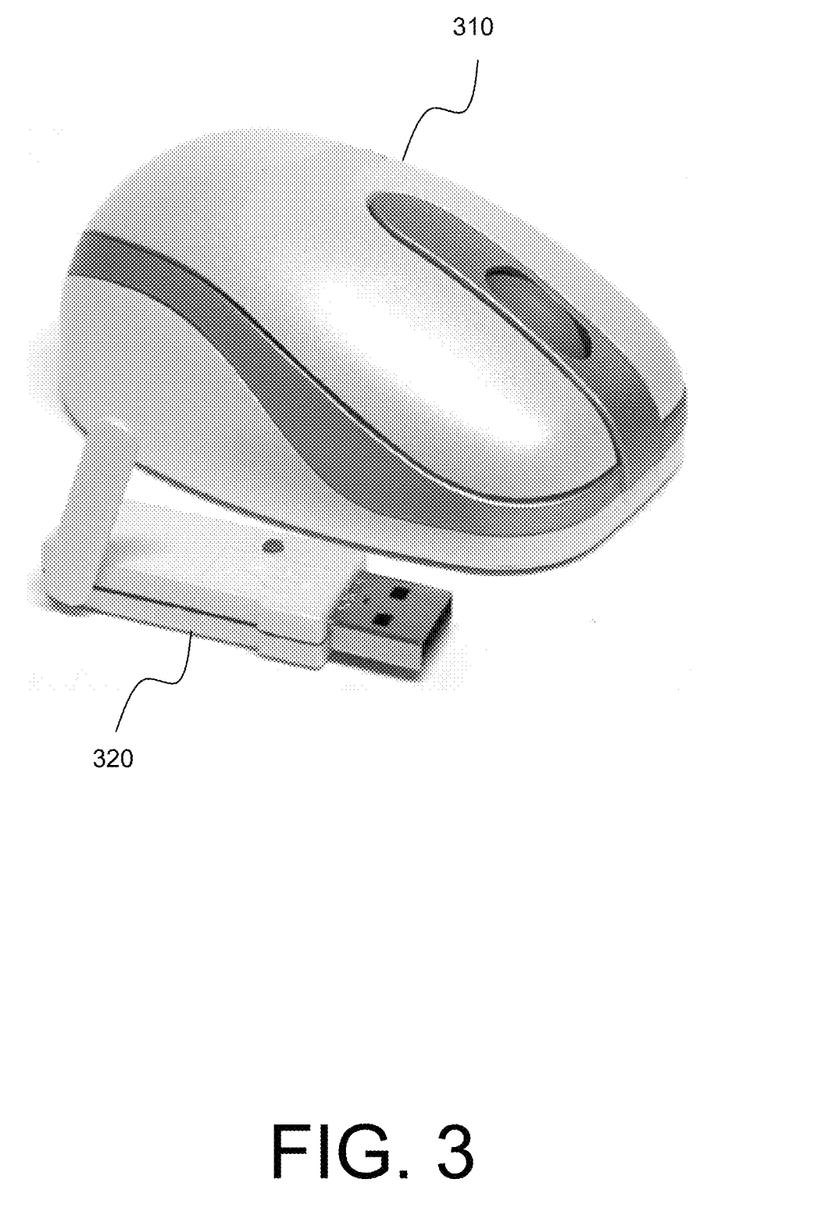
FIG. 3 illustrates one embodiment of a pair of wireless devices.

FIG. 3 illustrates one embodiment of a pair of wireless devices 310 and 320 which may correspond to wireless devices 20a and 20b in FIG. 1. Wireless device 310 is a wireless mouse for navigating a computer interface, and wireless device 320 is a dongle, for example, a universal serial bus (USB) dongle, that may be connected to a computer. By operating wireless device 310, a user may navigate a user interface of a computer to which wireless device 320 is connected and installed. Toward this end, signals are communicated between wireless devices 310 and 320 via wireless transmissions, such as wireless transmissions 25 of FIG. 1.

Wireless devices 310 and 320 communicate with each other over a frequency band that is shared with other devices. In particular, wireless devices 310 and 320 communicate with each other using a frequency hopping communication scheme. In one beneficial embodiment, wireless devices 310 and 320 communicate with each other in the 2.4 GHz band using a wireless communication protocol that is different than the Bluetooth communication protocol. Although FIG. 3 illustrates a wireless mouse and a dongle, other devices could be substituted, including for example, a wireless keyboard and a dongle.

Turning back to FIG. 1, in a beneficial arrangement, first and second wireless devices 20a and 20b employ an intelligent frequency hopping method to avoid, eliminate, minimize or reduce interference from the transmissions 15 by master device 10 and slave devices 12a, 12b and 12c. Details of embodiments of an intelligent frequency hopping method that may be employed by wireless devices 20a and 20b to avoid, eliminate, minimize or reduce interference from transmissions by master device 10 and slave devices 12a, 12b and 12c will now be provided.

To provide a concrete example embodiment of an intelligent frequency hopping method, and a wireless device employing such a method, the description to follow will describe an embodiment where wireless devices 20a and 20b communicate via a shared frequency band from 2.4 GHz to 2.4835 GHz. This frequency band may be shared by a number of different devices, including for example cordless telephones, IEEE 802.11 wireless LAN devices, Bluetooth devices, and other unlicensed devices which can cause interference to wireless devices 20a and 20b. This band is also susceptible to interference from microwave ovens.

A variety of different types of IEEE 802.11 devices exist, with IEEE 802.11b and IEEE 802.11n currently being the most popular. For example, IEEE 802.11b devices communicate using direct sequence spread spectrum signals and 22 MHz channels on 5 MHz spacings, so that up to three different LANs may operate on different channels without mutual interference in a given area.

Meanwhile, Bluetooth devices accomplish spectrum spreading by frequency hopping between 79 channels displaced by 1 MHz, starting at 2.402 GHz and ending at 2.480 GHz. In a few countries (e.g., France) this frequency band range may be reduced, in which case a 23-hop system is used. In order to comply with out of band spectral emission requirements, a guard band is used at the lower and upper band edges.

In this example, master device 10 and slave devices 12a, 12b and 12c are all Bluetooth device and all communicate according to the Bluetooth protocol, for example as set forth in Bluetooth Core Specification version 2.1+EDR, published 26 Jul. 2007 by the Bluetooth Special Interest Group (SIG). According to the Bluetooth protocol, master device 10 and slave devices 12a, 12b and 12c communicate with frequency hopping transmissions 15. The Bluetooth protocol is well-known and the Bluetooth Core Specification version 2.1+ EDR is widely available, including over the Internet, and a detailed description thereof is not repeated here for brevity. However, an understanding of some details of the radio layer or physical layer of the Bluetooth protocol may be helpful to an explanation of an embodiment of a method that may be employed wireless devices 20a and 20b to avoid, eliminate, minimize or reduce interference from Bluetooth devices 10, 12a, 12b and 12c, and so a brief description is now provided.

Bluetooth devices can interact with one or more other Bluetooth devices in several different ways. The simplest scheme is when only two devices are involved. This is referred to as point-to-point. One of the devices acts as the master and the other as a slave. This ad-hoc network is referred to as a piconet. Indeed, a piconet is any such Bluetooth network with one master and one or more slaves. FIG. 1 illustrates an example of a piconet comprising master device 10 and slave devices 12a, 12b and 12c. In the case of multiple slaves, the communication topology is referred to as point-to-multipoint. In this case, a communication channel is shared among all the devices in the piconet. All channel access is regulated by the master.

All packet transmissions are started at the beginning of one of a series of time slots. A packet may last up to five time slots. According to the Bluetooth protocol, for each time slot the Bluetooth devices in a piconet will hop to another frequency within the 2402 to 2480 MHz range. For a time slot of 625 µs, this translates to 1600 hops every second. Each piconet has a particular frequency hopping sequence which is determined according to an algorithm the uses the Bluetooth device address and clock of the master device. All Bluetooth units in the piconet are then synchronized to this frequency hopping sequence.

When a piconet is established between two (or more) devices, the master device establishes a frequency hopping sequence. This frequency selection process includes two components: selecting a frequency hopping sequence type; and mapping this sequence type onto the actual hop frequencies to produce the frequency hopping sequence. The Bluetooth protocol provides several different types of frequency hopping sequences, including a page hopping sequence, a page response sequence, an inquiry sequence, an inquiry response sequence and a channel hopping sequence. The Bluetooth protocol also allows Bluetooth devices to execute an adaptive frequency hopping algorithm to avoid, eliminate, minimize or reduce interference from IEEE 802.11 LAN devices operating in the vicinity. The frequency hopping sequence is determined from the selected frequency hopping sequence type, as described above, together with the Bluetooth device address (more specifically, the 28 lowest bits comprising the "MAC address" or more properly "BD_ADDR") of the master device. The phase in the hopping sequence is determined by the master device's clock, a 28 bit integer value that increments 3200 times per second.

Figure 4:
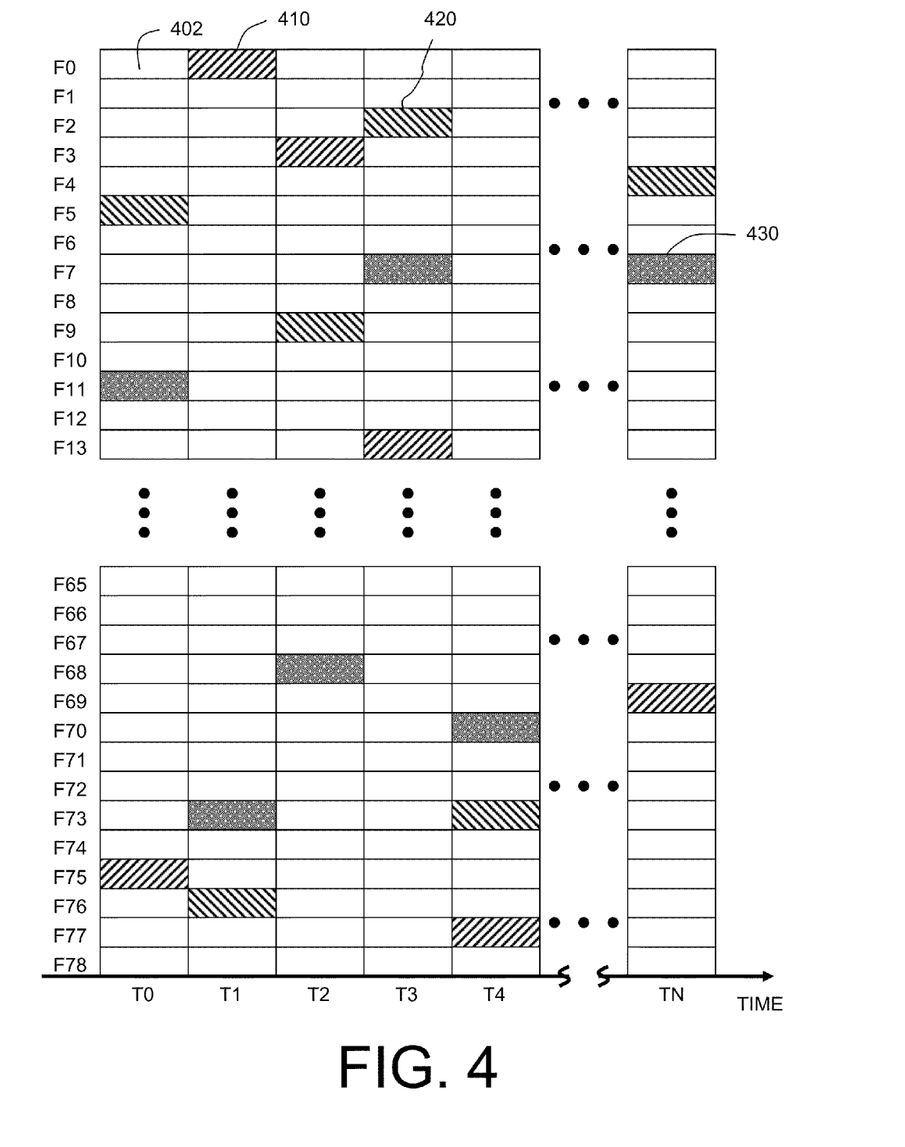
FIG. 4 illustrates examples of frequency hopping sequences.

FIG. 4 illustrates examples of frequency hopping sequences that may be employed for wireless communications. The vertical axis in FIG. 4 identifies 79 frequency channels from F0~F78, and the horizontal axis identifies a plurality of time slots T1~TN. FIG. 4 shows a grid having a plurality of frequency-channel/time-slots 402. Frequency-channel/time-slots identified in FIG. 4 with a unique shading correspond to an example of a frequency hopping sequence 410 that may be employed by master Bluetooth device 10 and slave Bluetooth devices 12a, 12b and 12c in FIG. 1.

Figure 5:
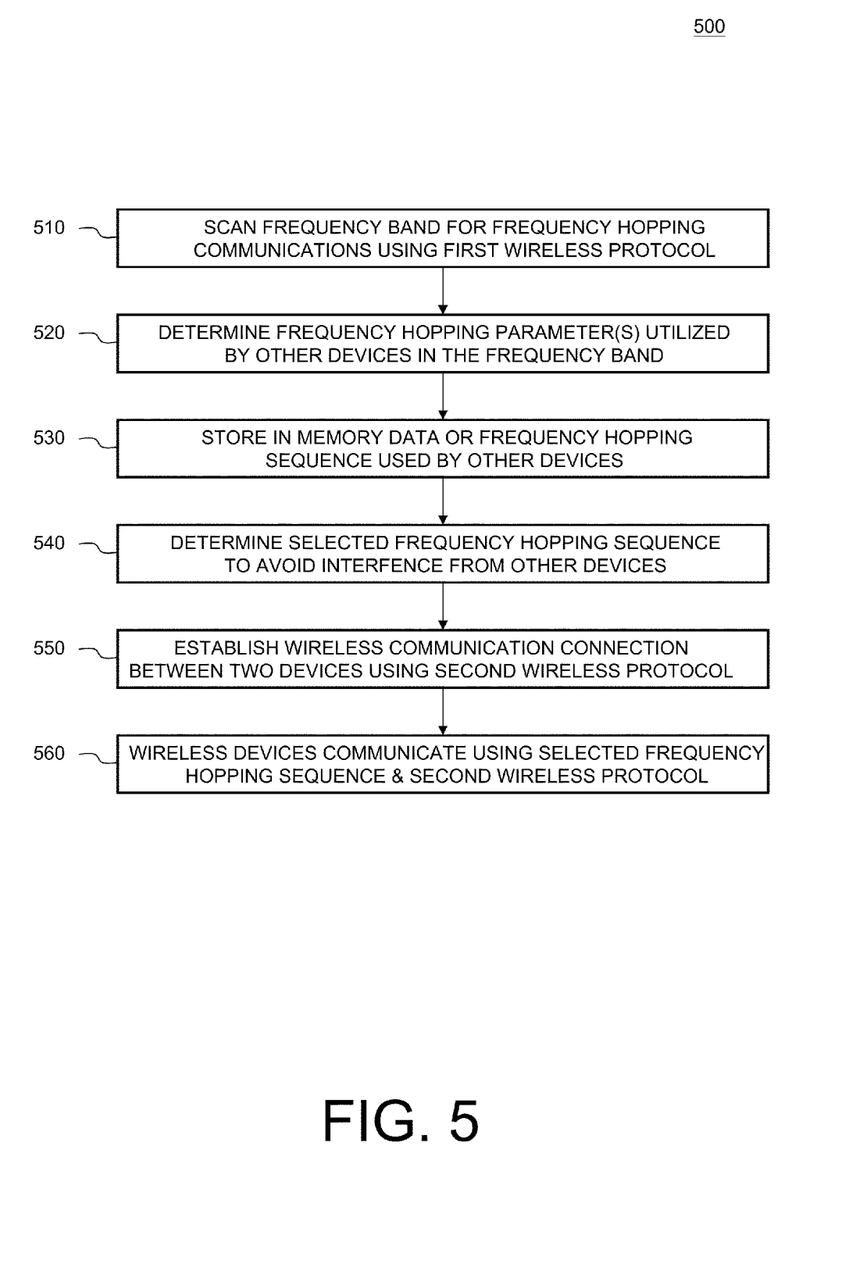
FIG. 5 shows a flowchart of one embodiment of a method of communication by wireless devices in a shared frequency band with an intelligent frequency hopping scheme.

FIG. 5 shows a flowchart of one embodiment of a method 500 of communication by wireless devices in a shared frequency band with an intelligent frequency hopping scheme. In particular, method 500 is one embodiment of a method that may be employed by wireless devices 20a and 20b in FIG. 1 to avoid, eliminate, minimize or reduce interference from master Bluetooth device 10 and slave Bluetooth devices 12a, 12b and 12c.

In a first step 510, a wireless device (which could be wireless device 20a) scans a frequency band for the presence of frequency hopping transmissions according to a first wireless protocol. In a particular example, wireless device 20a scans the 2.4 GHz frequency band to determine if there are any frequency hopping transmissions 15 by Bluetooth communication devices 10, 12a, 12b and 12c.

In a step 520, wireless device 20a determines one or more frequency hopping parameters employed by Bluetooth communication devices 10, 12a, 12b and 12c for frequency hopping transmissions 15. Beneficially, the one or more frequency hopping parameters allow wireless device 20a to determine the frequency hopping sequence 410 employed by Bluetooth communication devices 10, 12a, 12b and 12c.

In one embodiment, wireless device 20a receives a transmission from master device 10 that includes data that can be for identifying the first frequency hopping sequence 410. For example, in one embodiment wireless device 20a may attempt to join a piconet with master device 10. In one embodiment, wireless device 20a may attempt may passively monitor transmissions by master device 10 to determine the Bluetooth MAC address and clock of master device 10. As explained above, the frequency hopping sequence may be obtained from knowledge of the master's Bluetooth MAC address and clock of the master device. Dominic Spill and Michael Ossman have disclosed techniques for easily obtaining the MAC address and clock of a Bluetooth master device by passively monitoring transmissions of the master device (e.g., Dominic Spill, et al., "BlueSniff: Eve meets Alice and Bluetooth," USENIX Workshop on Offensive Technologies (2007); Michael Ossman, "Narrowing the Hop Search," ossmann.blogspot.com/2008/11/narrowing-hop-search.html (13 Nov. 2008). Other techniques could be employed.

In a step 530, wireless device 20a stores in its memory data that identifies the frequency hopping sequence 410 employed by master Bluetooth device 10 and slave Bluetooth devices 12a, 12b and 12c. In one embodiment wireless device 20a stores information for the MAC address and clock of master Bluetooth device 10 to allow wireless device 20a to determine, in conjunction with the Bluetooth specification, the frequency hopping sequence 410. In another embodiment, wireless device 20a stores a map of the frequency hopping sequence 410.

In a step 540, wireless device 20a determines a selected frequency hopping sequence 430 (see FIG. 4) to be employed by wireless devices 20a and 20b to avoid, eliminate, minimize or reduce interference from master Bluetooth device 10 and slave Bluetooth devices 12a, 12b and 12c. In particular, wireless device 20a determines a selected frequency hopping sequence 430 that does not conflict of clash with frequency hopping sequence 410 so that in each time slot, frequency hopping sequence 410 and frequency hopping sequence 430 are on different frequencies.

In some cases, wireless devices 20a and 20b may be operating in the vicinity of a second Bluetooth piconet with a frequency hopping sequence 420 different than the frequency hopping sequence 410. In that case, in one embodiment wireless device 20 also determines the frequency hopping sequence 420 used by the second piconet, and designs the selected frequency hopping sequence 430 to avoid both frequency hopping sequence 410 and frequency hopping sequence 420. Of course this may be generalized to an even larger number of Bluetooth piconets and frequency hopping sequences.

In a step 550, wireless device 20a establishes a wireless communication connection with wireless device 20b using a second wireless protocol different from the Bluetooth protocol employed by master Bluetooth device 10 and slave Bluetooth devices 12a, 12b and 12c. For example, wireless device 20a may employ different modulation types, different error correction algorithms, and/or different power management schemes, etc. than those used in the Bluetooth protocol. Thus, in some embodiments wireless device 20a may be considered to be a pseudo-Bluetooth device as it retains some features of a Bluetooth device, such as adaptive frequency hopping, except that it hops to frequencies not used by the Bluetooth devices and employs a different wireless communication protocol rather than the Bluetooth protocol. In one embodiment, when establishing the connection between wireless device 20a and wireless device 20b, wireless device 20a communicates to wireless device 20b data identifying the selected frequency hopping sequence to be employed by wireless device 20a and wireless device 20b.

In a step 560, wireless devices 20a and 20b communicate using the selected frequency hopping sequence 430 and the second wireless protocol different from the Bluetooth protocol.

Accordingly, as described above, two or more frequency hopping wireless devices may communicate in the same vicinity as other frequency hopping wireless devices (e.g., Bluetooth devices) and avoid or minimize interference from those other wireless devices, without being required to conform to the wireless communication protocol as used by the other frequency hopping wireless devices. Although for clarity of explanation, a concrete example has been explained above with respect to interference from Bluetooth devices, it should be understood the principles can be expanded beyond this particular example.

While example embodiments are disclosed herein, one of ordinary skill in the art appreciates that many variations that are in accordance with the present teachings are possible that remain within the scope of the appended claims. The embodiments therefore are not to be restricted except within the scope of the appended claims.

The invention claimed is:

1. A method executed by a wireless communication device, the method comprising:
receiving, in response to a request to join a communication network of Bluetooth communication devices, information identifying a first frequency hopping sequence from a master device among the Bluetooth communication devices, the Bluetooth communication devices communicating together in a frequency band according to a Bluetooth communication protocol using the first frequency hopping sequence;
determining, from the information identifying the first frequency hopping sequence, a second frequency hopping sequence that avoids interference with the first frequency hopping sequence; and
establishing wireless communication in the frequency band with another communication device using the second frequency hopping sequence, according to a communication protocol different from the Bluetooth communication protocol.

2. The method of claim 1, wherein the other communication device is a dongle connected to a computer, a wireless mouse, or a wireless keyboard.

3. The method of claim 1, wherein the second frequency hopping sequence hops at the same rate as the first frequency hopping sequence.

4. The method of claim 1, wherein the second frequency hopping sequence hops between frequencies spanning at least 40 MHz.

5. The method of claim 1, further comprising storing in a memory device data identifying the first frequency hopping sequence.

6. The method of claim 1, further comprising communicating to the other communication device information identifying the second frequency hopping sequence.

7. A wireless communication device comprising:
a receiver that receives Bluetooth and non-Bluetooth signals;
a transmitter that transmits the non-Bluetooth signals;
a processor that controls operations of the receiver and transmitter; and
a memory device that shares data with the processor, wherein the processor:
receives, in response to a request to join a communication network of Bluetooth communication devices, information identifying a first frequency hopping sequence from a master device among the Bluetooth communication devices, the Bluetooth communication devices communicating together in a frequency band according to a Bluetooth communication protocol using the first frequency hopping sequence,
determines, from the information identifying the first frequency hopping sequence, a second frequency hopping sequence that avoids interference with the first frequency hopping sequence, and
establishes wireless communication in the frequency band with another communication device using the second frequency hopping sequence, according to a communication protocol different from the Bluetooth communication protocol.

8. The device of claim 7, wherein the device includes one of a wireless mouse and a wireless keyboard.

9. The device of claim 7, wherein the device includes a dongle.

10. The device of claim 7, wherein the second frequency hopping sequence hops at the same rate as the first frequency hopping sequence.

11. The device of claim 7, wherein the second frequency hopping sequence hops between frequencies spanning at least 40 MHz.

12. The device of claim 7, wherein the memory device stores data identifying the first frequency hopping sequence.

13. The device of claim 7, wherein the processor further communicates to the other communication device information identifying the second frequency hopping sequence.

14. A method of communication by a first wireless device, the method comprising:
receiving, in response to a request to join a communication network of communication devices, information identifying a first frequency hopping sequence from a master device among the communication devices, the communication devices communicating together in a frequency band according to a first communication protocol using the first frequency hopping sequence;
determining, from the information identifying the first frequency hopping sequence, a second frequency hopping sequence that avoids interference with the first frequency hopping sequence; and establishing wireless communication in the frequency band with another communication device using the second frequency hopping sequence, according to a second communication protocol different from the first communication protocol.

15. The method of claim 14, wherein the second frequency hopping sequence hops between frequencies spanning at least 40 MHz.

16. The method of claim 14, further comprising storing in a memory device data that can be used for identifying the first frequency hopping sequence.

* * * * *